Feb. 8, 1949.  A. M. CANDY  2,460,921
MAGNETIC CONTROL SYSTEM
Filed Aug. 17, 1946  4 Sheets-Sheet 1

Inventor.
Albert M. Candy
By Brown, Jackson, Boettcher & Dienner
Attys.

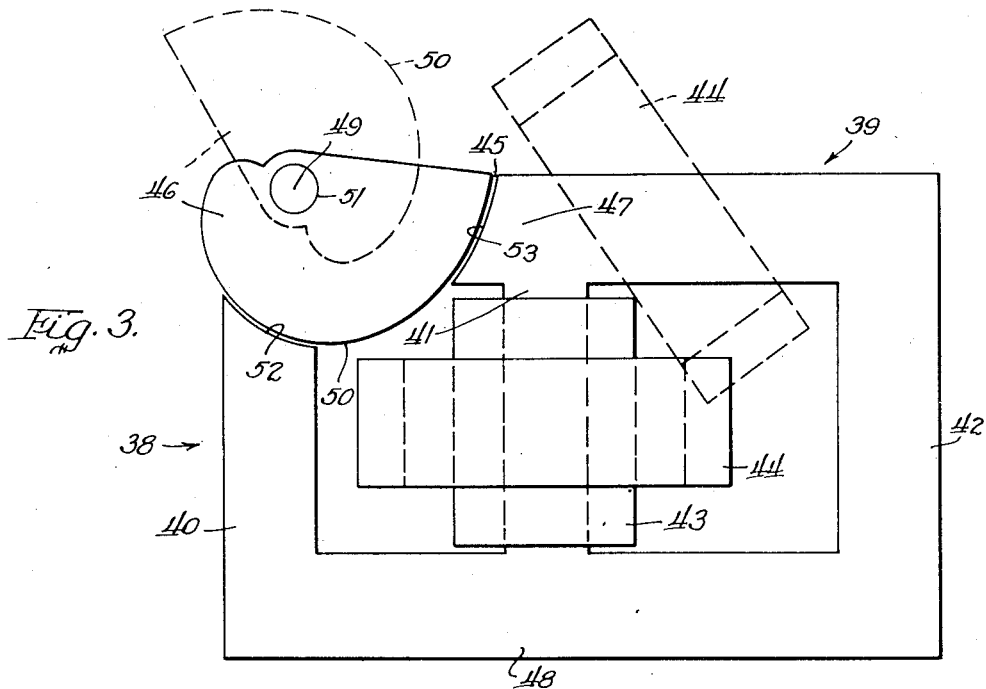
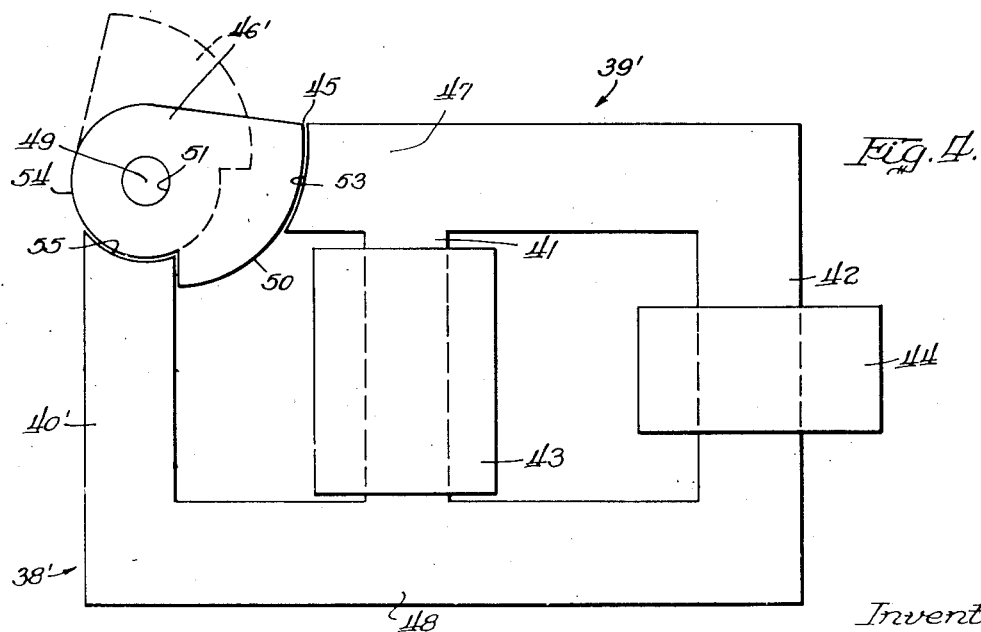

Inventor:
Albert M. Candy.
By Brown, Jackson, Boettcher & Dienner
Attys.

Feb. 8, 1949.  A. M. CANDY  2,460,921
MAGNETIC CONTROL SYSTEM
Filed Aug. 17, 1946  4 Sheets-Sheet 4

Inventor
Albert M. Candy
By Brown, Jackson,
Boettcher & Dienner
Attys.

Patented Feb. 8, 1949

2,460,921

UNITED STATES PATENT OFFICE 2,460,921

MAGNETIC CONTROL SYSTEM

Albert M. Candy, La Grange, Ill., assignor, by mesne assignments, to National Cylinder Gas Company, Chicago, Ill., a corporation of Delaware Application August 17, 1946, Serial No. 691,357

15 Claims. (Cl. 171—119)

My invention relates, generally, to means for maintaining a predetermined relation between juxtaposed surfaces of a pair of relatively rotatable members and it has particular relation to employing such means in magnetic control systems.

When a rotatable shunt or rotor is employed for controlling the flux interlinking the primary and secondary windings of a welding transformer for varying the flow of welding current in the secondary winding, difficulty has been encountered in obtaining a change in the flux in accordance with the change in position of the shunt. This has been due to the fact that the length of the air gap or gaps involved for each position of the rotatable shunt or rotor has been nonuniform. Because of this, instead of their being a variation in flux in accordance with the degree of rotation of the shunt or rotor from one position to another, as from a position where a maximum amount of flux is shunted through the shunt or rotor toward another position, the flux tends to increase in density in the areas which are nearest to each other with the result that, while a shifting of the flux takes place, there is no substantial change in the total flux which is the end desired.

Accordingly, among the objects of my invention are: To provide for maintaining a predetermined uniform relationship between juxtaposed surfaces of a pair of relatively rotatable members as they are rotated relatively to each other; to maintain a uniform distribution of the magnetic flux in an air gap in a magnetic core structure between the stator and rotor forming the same, as the rotor is rotated toward and away from the stator; to maintain a constant distance between one or more surfaces of the stator and one or more cooperating surfaces of the rotor, the distance depending upon the position of the rotor; and to employ the means for accomplishing these objects for controlling the flux linkage between the primary and secondary windings of a welding transformer to control the magnitude of the welding current, for varying the inductance of a variable inductor, for controlling the characteristics of a dynamo electric device, for controlling the operation of an electromagnetic switch or relay and for like purposes.

In accordance with my invention at least two of the juxtaposed cooperating surfaces of the stator and rotor are of involute form so chosen that the distance therebetween is constant for any operative position of the rotor, the distance being determined in accordance with the position of the rotor. An involute is defined as a curve traced by a point of a perfectly flexible inextensible thread kept taut as it is wound upon or unwound from another curve. In accordance with my invention the other curve referred to is a circle whose center coincides with the axis of rotation of the rotor.

It is in order to define further the other curve just referred to. The curve by unwrapping from which, a series of involutes is obtained, is said to be their common evolute and any two involutes of a curve constitute a pair of parallel curves, their corresponding tangents being parallel, and their corresponding points, situated on the same normal being at a constant distance from one another. If any one involute curve is rotated about the center of its evolute curve then in certain positions it will only be parallel with certain portions of the other involutes unless the evolute curve is a circle. In the case where the evolute is a circle, if any one involute curve is rotated (in the unwrapping direction of the involute) about the center of the evolute circle, then in any position it will be parallel throughout its entire length with the entire portion of any other involute extending beyond the straight line drawn normal (in the wrapping direction) from the point of origin of the moved involute. It follows that, if two involute surfaces are provided having a common evolute surface and it is a cylinder about the axis of which one of the involute surfaces is rotated away from or toward the other, the surfaces will be at a constant distance from one another over their entire areas located beyond the normal drawn in the wrapping direction from the origin of the surface displaced in the unwrapping direction from the other surface, the distance in each case depending upon their relative positions.

In accordance with my invention I make use of this principle in the design of the cooperating surfaces of the core and shunt or stator and rotor in a transformer, for example, for the purpose of changing the flux linking the primary and secondary windings. In this manner it is possible to vary uniformly and with precision the flux linking these windings and thereby the amount of current that will flow in the secondary winding. A rotor is provided having at least one surface which is an involute of a base cylinder whose axis is the axis of rotation of the rotor or the axis of the base cylinder coincides with the axis of rotation of the rotor. A cooperating involute surface or surfaces are provided on the core. As the involute surface or surfaces on the rotor are moved away from the cooperating involute surface or surfaces on the core, a constant distance is maintained between the stationary surface or surfaces and the rotor surface or surfaces and there is a uniform change in the flux rather than merely a shifting and concentration of the flux as is the case when the length of the air gap is nonuniform.

The present invention has many applications. It can be employed in connection with a variable inductor for varying its inductance. It can be employed for controlling the characteristics of a dynamo-electric device where the characteristics are changed by varying the amount of flux emanating from one or more of the field poles and entering the coacting member. The invention also can be employed in the construction of electro-magnetically operated switches or relays. It may be employed for any application where two members rotate relatively to each other and it is desired to maintain a uniform length of spacing therebetween on relative movement thereof, the spacing in each instance depending upon the relative positions of the members.

In order to provide a more complete understanding of the nature and scope of my invention reference may be had to the accompanying drawings in which:

Figure 3 illustrates, diagrammatically, a modified form of welding transformer in which a single involute surface on the rotor cooperates with two correspondingly shaped surfaces on the stator or core and one of the transformer windings can be moved bodily from one position to another to further vary the flux interlinking the windings;

Figure 4 illustrates, diagrammatically, a construction, similar to that shown in Figure 3, with the rotor having an involute surface for cooperating with a corresponding surface on the core or stator and also having a cylindrical surface for cooperating with a similar surface on the core or stator;

Figure 1:
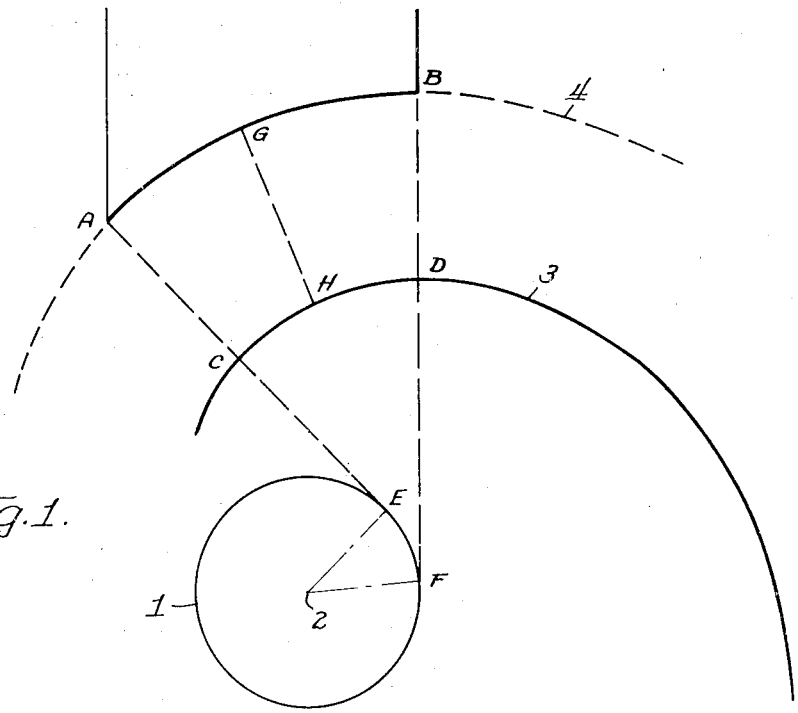
Figure 1 illustrates certain of the geometric details that are involved in the present invention.

In order to understand more fully the principles underlying my invention, reference may be had first to Figure 1 of the drawings. The reference character 1 designates a base circle whose center is at 2. The circle 1 is the evolute of involutes 3 and 4. As indicated, involute 3 may be a rotor involute, i. e. a part of the surface of a rotor that is rotatable about center or axis 2. Involute 4 is a stator involute, i. e. the surface of a stator which cooperates with the rotor. The evolute of the stator involute must be the circle 1. Arc AB indicates the portion of the stator involute 4 that cooperates with arc CD of the rotor involute 3 the distance between which is to be maintained constant for any given position of the latter, as the latter is rotated about the center 2. A normal AE drawn from A to the base circle 1 is tangent thereto at E. Likewise, a normal BF drawn from B to the base circle 1 is tangent to it at F. The lines AE and BF are normal to both involutes 3 and 4. Hence the distance AC equals the distance BD and also equals the distance GH which is measured on a line normal to the involutes 3 and 4. It follows that, as the rotor involute is rotated about the center 2, the distance between it and the stator involute 4 is constant, in any given position. The distance between the two of course changes with revolution of the rotor.

Figure 2:
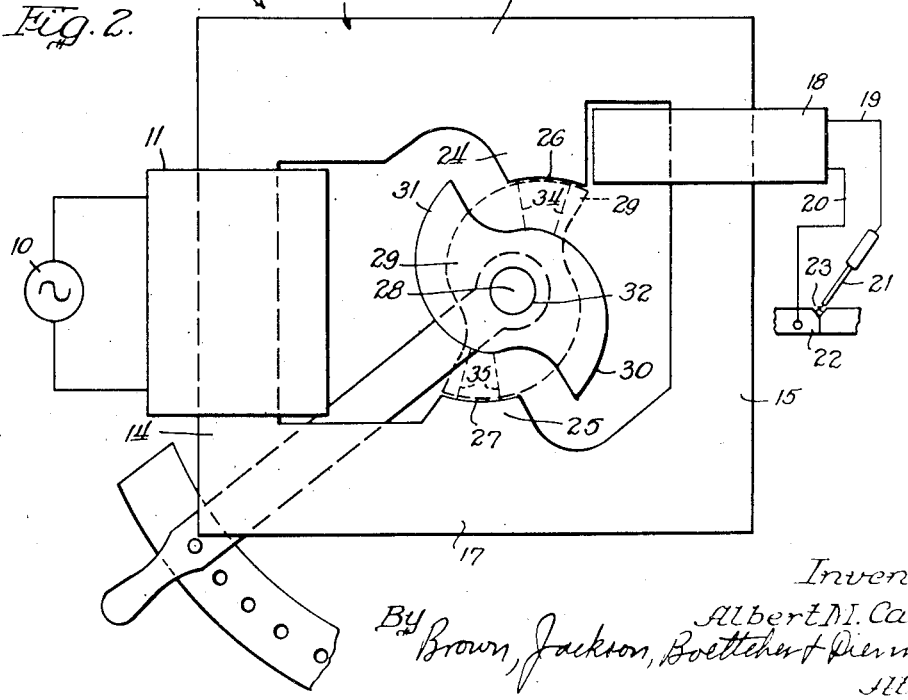
Figure 2 illustrates, diagrammatically, a welding transformer employing a rotor for controlling the flux interlinking the primary and secondary windings, the rotor having two faces which are involutes of a base cylinder whose axis coincides with the axis of rotation of the rotor.

Referring now particularly to Figure 2 of the drawings, it will be observed that the reference character 10 designates a source of alternating current, such as a 60 cycle 110, 220 or 440 volt source. The source 10 may be connected to energize a primary winding 11 of a transformer which is indicated, generally, at 12. The transformer 12 includes a magnetic core structure or stator which is indicated, generally, at 13. The core structure 13 is preferably formed of laminated steel, such as silicon steel or similar material that is used commonly in transformer construction.

The core or stator 13 may be generally rectangular in shape and may comprise end legs 14 and 15 which are interconnected by intermediate legs or members 16 and 17. The primary winding 11 is located on leg 14 and a secondary winding 18 is positioned on leg 15.

The secondary winding 18 may be connected to energize a welding circuit comprising conductors 19 and 20 which may be connected, respectively, to a welding electrode 21 and work 22 between which an arc 23 is maintained for performing the welding operation. Since a wide range of welding currents is required for performing various welding operations, it is desired that means be provided for varying the amount of current that flows through the secondary winding 18. This may be accomplished by varying the magnetic flux in the core or stator 13 which interlinks the primary and secondary windings 11 and 18.

In order to vary the flux interlinking the windings 11 and 18 provision is made for shunting a portion of the flux around the secondary winding 18 so that it does not interlink the same. By this means a corresponding control of the flow of current therein may be obtained.

In accordance with the present invention this shunting of the flux may be attained by providing polar projections 24 and 25 on the inner sides of the legs 16 and 17 having surfaces 26 and 27 which are in the form of involutes of a base cylinder whose axis coincides with the axis 28 of rotation of a rotor 29 of magnetic material which forms the flux shunting member. The rotor 29 is provided with surfaces 30 and 31 which also are involutes of the same base cylinder as that of the rotor whose axis coincides with the axis 28.

The base cylinder, which may be employed for generating the involute surfaces 26—27 and 30—

31 is indicated at 32 by the circular line. This base cylinder 32 then is a common evolute for the two sets of involutes 26—27 and 30—31 which cooperate, respectively, with each other in varying the air gaps between the polar projections 24—25 and the rotor 29. It will be observed that the length of the air gap, as indicated by the broken lines 34 and 35 between the surfaces 26—30 and 27—31 is a constant. This relationship exists for any position of the rotor 29 from the position thereof shown by the broken lines to the position thereof as shown by the full lines. In each case the distance depends, of course, upon the relative position of the rotor 29 with respect to the core or stator 13 and there is a corresponding change in the reluctance of the magnetic core structure 13.

Referring now to Figure 3 of the drawings, a modified construction is illustrated. A transformer is shown, generally, at 38 and it comprises a core or stator, indicated generally at 39, of magnetic material. This may be generally rectangular in shape and is provided with three legs 40—41—42. Primary and secondary windings 43—44 are located encircling the middle leg 41. It will be understood that the primary winding 43 may be connected for energization to a suitable source of alternating current and that the secondary winding 44 may be connected to a welding circuit, as illustrated in Figure 2.

In order to vary the flow of current through the secondary winding 44 provision is made for varying the flux interlinking it and the primary winding 43. This is accomplished, in part, by mounting secondary winding 44 so that it can be rotated from the position shown by the full lines around the primary winding 43 to the position thereof shown by the broken lines where it is not so closely coupled to the primary winding 43. The secondary winding 44 can be swung by suitable mechanical means, not shown, from one position to the other through an air gap 45 the length of which is controlled by a shunt or rotor 46. In order to permit movement of the secondary winding 44 to the position thereof shown by the broken lines, it is necessary, of course, to move the rotor 46 to the position thereof shown by the broken lines.

It will be observed that the air gap 45 extends between the leg 47 of the core or stator 39 and one end leg 40. Another leg 48 is common to the three legs 40—41—42 and interconnects the same.

The rotor 46 is mounted for rotation by suitable means, not shown, about an axis 49. It has a single involute surface 50 which is formed using a base cylinder 51 whose axis coincides with the axis of rotation 49. The involute surface 50 cooperates with correspondingly shaped surfaces 52 and 53 of the legs 40 and 47, respectively. Thus, in the construction shown in Figure 2, a single involute surface 50 on the rotor 46 cooperates with two involute surfaces 52 and 53 on the stator 39 to provide the desired variation in the length of the air gap 45. Since the involute surfaces 52 and 53 are formed using the same base cylinder 51 that is used for the involute 50, the distances between the cooperating surfaces will be constant over their entire areas and will depend upon the position of the rotor 46.

The construction illustrated in Figure 4 is similar to that illustrated in Figure 3. A transformer 38' as there shown having a core construction or stator 39' which includes legs 40'—41'—42'. The primary winding 43 is located surrounding the middle leg 41 while the secondary winding 44 surrounds leg 42.

A movable shunt or rotor 46' of magnetic material controls the flux in the air gap 45. The rotor 46' has a surface 50 which is an involute of the base cylinder 51 whose axis coincides with the axis 49 of rotation of the rotor 46'. The surface 50 cooperates with a corresponding involute surface 53 at the end of the leg 47 of the core or stator 39'.

In the construction shown in Figure 4, the involute surface 50 cooperates with a single correspondingly shaped surface 53. As there shown, the rotor 46' has a cylindrical surface 54 whose axis coincides with the axis 49 of rotation of the rotor 46'. A corresponding cylindrical surface 55 is provided at the upper end of the leg 40'. Because of this configuration the distance between the rotor 46' and the upper end of the leg 40' does not change as the rotor 46' is moved from the position thereof shown by the full lines to the position thereof shown by the broken lines.

Figure 5:
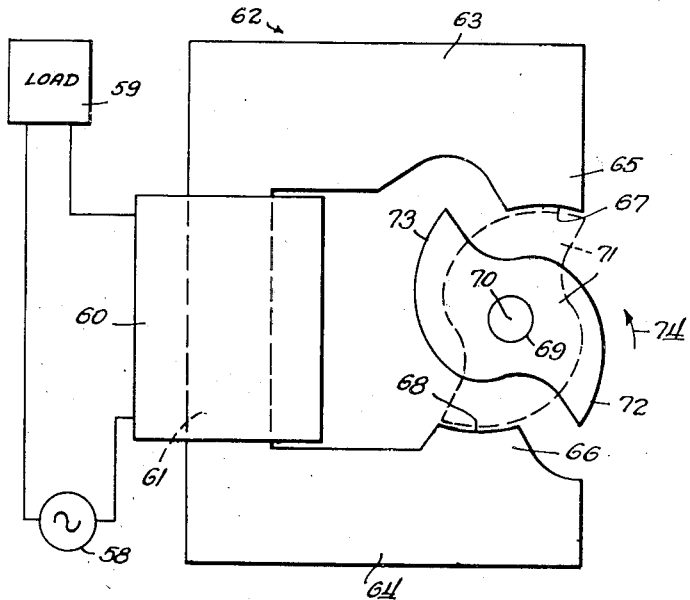
Figure 5 illustrates, diagrammatically, how the present invention can be incorporated in a variable inductor.

In Figure 5 of the drawings a source 58 of alternating current is connected to energize a load 59 through a winding 60, the inductance of which is to be varied in order to vary the voltage applied to the load 59. The winding 60 is located on a leg 61 of a magnetic core or stator, shown generally at 62. The stator 62 also includes arms 63 and 64 having polar projections 65 and 66.

The polar projections 65 and 66 have surfaces 67 and 68 which are involutes of a base cylinder 69 whose axis is located at 70 which is also the axis of rotation of a shunt or rotor 71 of magnetic material. The rotor 71 has involute surfaces 72 and 73 which are formed about the same base cylinder 69 as the involute surfaces 67 and 68 so that, as the rotor 71 is moved in the direction indicated by the arrow 74 from the position shown by the full lines to the position shown by the broken lines, the distance between the surfaces 67—72 and 68—73 is constant for any position of the rotor 71.

It will be recognized that the construction illustrated in Figure 5 is similar to the construction illustrated in Figure 2, the difference residing in the omission of the secondary winding 18 and the leg 15 of the core or stator 13 on which the same is mounted. Further, it will be recognized that any of the constructions illustrated in Figures 2, 3 and 4 of the drawings can be connected to act as a variable inductor, such as illustrated in Figure 5, if this arrangement is desired.

Figure 6:
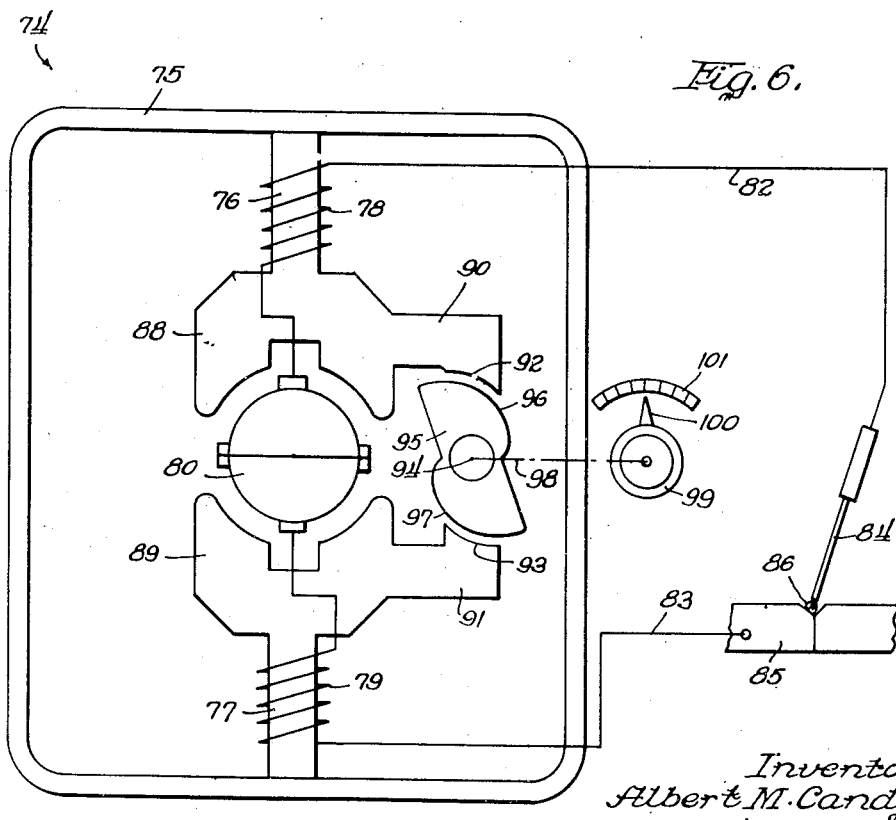
Figure 6 illustrates, diagrammatically, how the present invention can be incorporated in a dynamo-electric device for controlling its operating characteristics.

In Figure 6 of the drawings, a dynamo-electric device is illustrated, generally, at 74 which is of the cross-field type, such as shown in Patent No. 2,227,678. The operating characteristics of the device 74 are changed by varying the flux emanating from its field poles or shunting the field flux around the rotor.

It will be observed that the device 74 comprises a frame 75 of magnetic material having pole pieces 76 and 77 extending inwardly therefrom. Series windings 78 and 79 surround the pole pieces 76 and 77 and they are connected in series circuit relation with each other through an armature 80 of the cross field type. The series connected windings 78 and 79 are connected to energize a welding circuit comprising conductors 82 and 83 which may be connected, respectively, to a welding electrode 84 and work 85 between which an arc 86 is maintained for performing the welding operation. Since the operating characteristics of the device 74 are described in detail in the patent referred to above, they will not be described in detail herein.

The pole pieces 76 and 77 terminate in pole shoes 88 and 89 adjacent the armature 80. The operating characteristics of the device 74 may be controlled by controlling the flux which is shunted around the armature 80 between the pole shoes 88 and 89. For this purpose the pole shoes 88 and 89 may be provided with extensions 90 and 91 which terminate in surfaces 92 and 93 that are involutes of a base cylinder whose axis is located at 94. The axis 94 coincides with the axis of rotation of a shunt or rotor 95 which has surfaces 96 and 97 that are involutes of the same base cylinder which is employed in forming the involutes for the surfaces 92 and 93. The shape of the rotor 95 is substantially the same as the shape of the rotor 29, shown in Figure 2, or the rotor 71 shown in Figure 5. If desired, the rotor construction illustrated in Figures 3 and 4 can be employed in lieu of that shown in Figure 6.

The rotor 95 may be mounted on the shaft, indicated at 98 by the broken line, which carries a hand wheel 99 to permit manual adjustment of the rotor 95. The hand wheel 99 may be provided with a pointer 100 which cooperates with a scale 101 that may be calibrated in terms of current output of the device 74 for various positions of the rotor 95.

Figure 7:
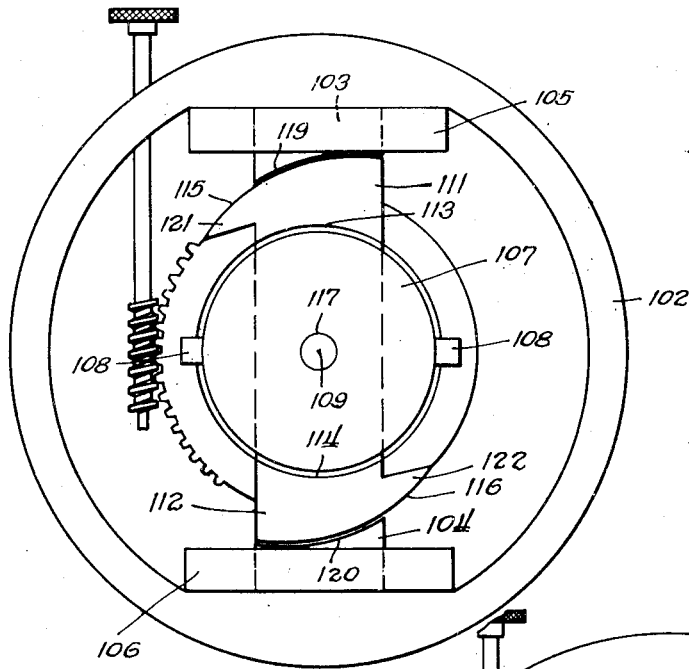
Figure 7 illustrates, diagrammatically, how this invention can be incorporated in another form of dynamo-electric device.

As shown in Figure 7, the present invention can be incorporated in a dynamo-electric device of the kind shown in the Patent No. 996,253. This patent shows how shoes of magnetic material can be employed in conjunction with radially inwardly extending field poles for varying the flux emanating therefrom, and thereby varying the operating characteristics of the device either to change its output as a generator or its speed as a motor.

The dynamo-electric device disclosed herein includes a generally circular frame 102 of magnetic material having radially inwardly projecting poles 103 and 104, which are surrounded by exciting windings 105 and 106 respectively. Between the poles 103 and 104 is an armature 107 of conventional design having a commutator with which brushes 108 engage. The axis of rotation of the armature 107 is indicated at 109.

Now, in order to vary the operating characteristics of the dynamo-electric device, shoes 111 and 112 of magnetic material are provided between the poles 103 and 104, and the surface of the armature 107. The surfaces 113 and 114 of the shoes 111 and 112, adjacent to the cylindrical surface of the rotor 107, are cylindrical, their axis being the axis 109 of the armature 107. Provision is made for mechanically moving the shoes 111 and 112 conjointly around the axis 109. Since the surfaces 113 and 114 are concentric with the surface of the armature 107, the distance therebetween will not change as the shoes 111 and 112 are rotated.

The control of the operating characteristics of the device is obtained by varying the lengths of the air gaps between the poles 103 and 104 and their respective shoes 111 and 112. For this purpose, the shoes 111 and 112 are provided with involute surfaces 115 and 116 of an evolute or base cylinder 117, which, if desired, may conform to the outer periphery of the shaft on which the armature 107 is mounted. The poles 103 and 104 are provided with corresponding involute surfaces 119 and 120, formed from the same base cylinder 117. Now, when the shoes 111 and 112 are rotated about the axis 103, the distances between the surfaces 115—119 and 116—120 will be constant and the lengths will depend upon the degree of rotation of the shoes 111 and 112. The shoes 111 and 112 have extensions 121 and 122, respectively, to provide the necessary magnetic material adjacent the surfaces 119 and 120 while the shoes 111 and 112 are rotated away from the positions thereof shown by the full lines in Figure 7 of the drawings.

Figure 8:
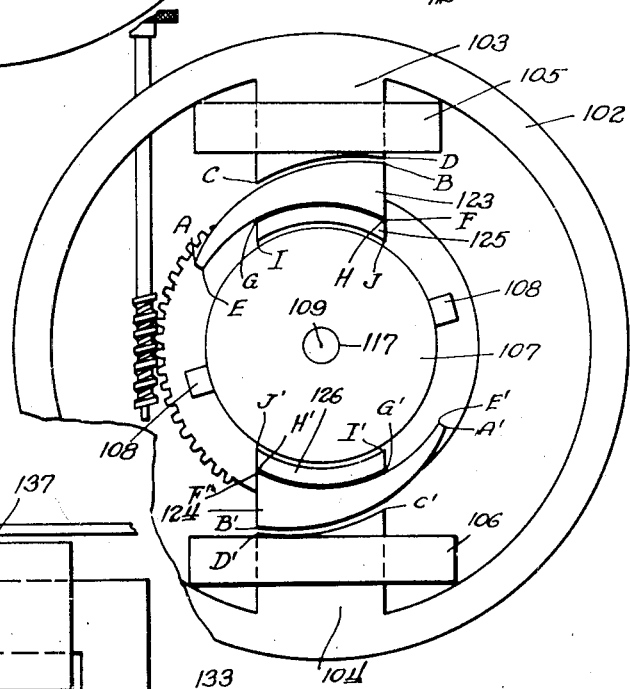
Figure 8 illustrates, diagrammatically, a modification of the construction shown in Figure 7.

In Figure 8 of the drawings a modification of the construction illustrated in Figure 7 is shown. Instead of the one piece shoes 111 and 112, as shown in Figure 7, these shoes are made up of two parts of suitably laminated magnetic material 123—124 and 125—126.

The outer surfaces A—B and A'—B' of the shoes 123—124 are involutes of a base circle, for example, the circle 117. These outer surfaces cooperate with correspondingly shaped surfaces C—D and C'—D' of the poles 103—104. The shoes 123—124 are mounted for conjoint rotation about the axis 109 so that, as they are rotated, the air gaps between the surfaces A—B and C—D and between the surfaces A'—B' and C'—D' will change uniformly over their entire areas.

The inner surfaces E—F and E'—F' of the shoes 123 and 124 are cylindrical with the axis coincident with the axis 109. The cooperating surfaces G—H and G'—H' of the shoes 125—126 likewise are cylindrical, as are the inner surfaces I—J and I'—J' with their axes coincident with the axis 109. If desired, the shoes 125—126 may be mounted stationarily.

As the shoes 123—124 are moved about the axis 109, the desired regulation of the dynamo-electric device is obtained by variations in the lengths of the air gaps between the surfaces A—B and C—D and between the surfaces A'—B' and C'—D'. If the shoes 125—126 are held stationary, the shoes 123—124 can move relatively thereto with substantially no change in the spacing therebetween, and likewise no change in the length of the air gaps between the shoes 125—126 and the armature 107. When the shoes 125—126 are mounted for movement with the shoes 123—124, the air gaps between the shoes 125—126 and the armature 107 remain substantially constant.

Figure 9:
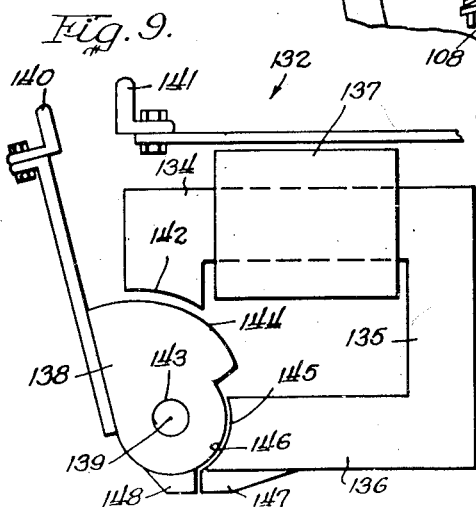
Figure 9 shows an electromagnetically operated switch or relay in which the present invention is incorporated.

In Figure 9 of the drawings an electromagnetic switch or relay is illustrated, generally, at 132. It includes a magnetic core structure, indicated generally at 133, which may be generally C-shaped and comprises legs 134—135—136. An operating winding 137 may be located on leg 134. It will be understood that the winding 137 may be energized from either a direct current or an alternating current source. If alternating current is applied, then the core structure 133 is preferably of laminated construction.

An armature 138 is mounted by suitable means, not shown, for rotation about an axis 139 and it carries a movable contact 140 for engaging a stationary contact 141. It will be understood that the contacts 140 and 141 are shown for illustrative purposes and that instead of make contacts, break contacts may be employed. It will be understood also that various combinations of make and break contacts can be used as will be readily appreciated by those skilled in the art.

The leg 134 terminates in a surface 142 which is an involute of a base cylinder 143 whose axis coincides with the axis 139 of rotation of the armature 138. The armature 138 also is provided with an involute surface 144 which is formed using the same base cylinder 143. Thus the distance between the surfaces 142 and 144, for any position of the armature 138, is constant.

The leg 136 terminates in a cylindrical surface 145 and the juxtaposed surface 146 of the armature 138 is a similarly shaped surface with the axis coincident with the axis 139 of rotation of the armature 138. Cooperating stops 147 and 148 are provided on the leg 136 and armature 138, respectively, for limiting the movement of the armature 138 under the influence of gravity in the separation of the contacts 140 and 141.

It will be recognized that the armature 138 has a shape which is similar to that of the rotor 46' which is illustrated in Figure 4 of the drawings. It will be understood that the rotor 138 may have other shapes, such as the shapes of the rotors 29 and 46 shown in Figures 2 and 3, respectively.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

I claim as my invention:

1. For combination with a welding transformer having a magnetic core and primary and secondary windings thereon with the primary winding connected to a source of alternating current and the primary winding connected to a welding circuit, means for varying the magnetic flux interlinking said windings comprising, a magnetic rotor for mounting in cooperative relation to said core, said core and rotor having juxtaposed surfaces which are involutes of a base cylinder the axis of which coincides with the axis of rotation of the rotor whereby, on rotation thereof from one position to another, said surfaces are at a constant distance from one another, the distance depending upon the position of the rotor, thereby providing an air gap between said surfaces of constant length at any operative position of the rotor and uniform distribution of the magnetic flux thereacross.

2. The invention, as set forth in claim 1, wherein the core has two surfaces of involute form for cooperating with two corresponding surfaces on the rotor.

3. The invention, as set forth in claim 1, wherein the core has two surfaces of involute form and the rotor has a single surface of involute form that cooperates with both of said core surfaces.

4. The invention, as set forth in claim 1, wherein the core has three legs and the primary and secondary windings are located on the middle leg.

5. A variable inductor, comprising, a magnetic core having an air gap therein, an energizable winding on said core the inductance of which is to be varied, and a magnetic rotor for varying said air gap, said core and rotor having juxtaposed surfaces between which said gap is provided and which are involutes of a base cylinder the axis of which coincides with the axis of rotation of the rotor.

6. For combination with a dynamo-electric device having field poles wherein the operating characteristics are determined in accordance with the flux emanating from one or more of said field poles, means for varying the flux emanating from at least one field pole comprising a magnetic rotor for mounting in cooperative relation to said field pole, said rotor and field pole having juxtaposed surfaces which are involutes of a base cylinder the axis of which coincides with the axis of rotation of the rotor.

7. The invention, as set forth in claim 6, wherein the flux varying means comprises a pair of shoes of magnetic material rotatable about the axis of rotation of the armature of the dynamo-electric device; the inner surfaces of said shoes being cylindrical with the axis coinciding with said axis of rotaton, and the outer surfaces being involutes of a base cylinder whose axis coincides with said axis of rotation and cooperating with the inner ends of oppositely positioned field poles whose surfaces are involutes of said base cylinder.

8. The invention, as set forth in claim 6, wherein the flux varying means comprises a pair of outer shoes of magnetic material rotatable about the axis of rotation of the armature of the dynamo-electric device and a pair of interposed inner shoes of magnetic material; the inner surfaces of said outer shoes and the inner and outer surfaces of said inner shoes being cylindrical with their axes coincident with the axis of rotation, and the outer surfaces of said outer shoes and the cooperating inner surfaces of the field poles being involutes of a base cylinder whose axis coincides with said axis of rotation.

9. In combination, a pair of relatively rotatable members of magnetic material between which there are a plurality of air gaps the length of each of which is variable on relative rotation of said members, the surface of one of said members which constitutes one terminus of said air gaps being an involute of a base cylinder whose longitudinal axis coincides with the axis of relative rotation of said members and the surface of the other of said members which constitutes the other terminus of said air gaps substantially coincides with the juxtaposed surface of said one member whereby on relative rotation of said members the length of each air gap is uniform over the area of the juxtaposed surfaces at any relative position of said members, and an energizable winding on one of said members.

10. In combination, a magnetic core structure and means to vary the reluctance thereof through a gap therein comprising a stator and a cooperating motor having juxtaposed surfaces between which said gap is provided and which are involutes of a common circular evolute whereby said gap remains uniform throughout its extent for any given degree of rotation of said rotor, and energizable winding means on said core structure.

11. In combination, a magnetic core structure and means to vary the reluctance thereof through a gap therein comprising a stator and a cooperating rotor having juxtaposed surfaces which are cylindrical and coaxial whereby, on rotation of the rotor, the distance therebetween remains constant, said stator and rotor having additional juxtaposed surfaces between which said gap is provided and which are involutes of a common circular evolute whereby, on said rotation of the rotor, said additional surfaces are at a uniform distance from each other for any given degree of rotation of said rotor, the distance depending upon the position of the rotor, and energizable winding means on said core structure.

12. In combination, a magnetic core structure and means to vary the reluctance thereof through a gap therein comprising a stator and a cooperating rotor having juxtaposed surfaces between which said gap is provided and which are involutes of a base cylinder, the axis of which coincides with the axis of rotation of the rotor whereby, on rotation thereof from one position to another, said surfaces are at a uniform distance from one another for any given degree of rotation of said rotor, the distance depending upon the position of the rotor, and energizable winding means on said core structure.

13. In combination, a magnetic core structure and means to vary the reluctance thereof through a gap therein comprising a stator and a cooperating rotor having juxtaposed surfaces which are cylindrical and coaxial whereby on rotation of the rotor the distance therebetween remains constant, said stator and rotor having additional juxtaposed surfaces between which said gap is provided and which are involutes of a base cylinder the axis of which coincides with the axis of rotation of the rotor whereby, on rotation thereof from one position to another, said surfaces are at a uniform distance from one another for any given degree of rotation of said rotor, the distance depending upon the position of the rotor, and energizable winding means on said core structure.

14. In combination, a magnetic core structure through which magnetic flux flows and means to vary the reluctance thereof through a gap therein comprising relatively rotatable members of magnetic material having juxtaposed surfaces between which said gap is provided and one of which is an involute of a base cylinder whose longitudinal axis coincides with the axis of relative rotation of said members and the other of which substantially coincides with said one surface when said surfaces are in juxtaposed relation, and an energizable winding on said core structure the flux linking which is varied on relative rotation of said members as a result of variation in the length of the air gap between said surfaces.

15. In combination, a magnetic core structure through which magnetic flux flows and means to vary the reluctance thereof through a gap therein comprising a stator and a cooperating rotor having juxtaposed surfaces between which said gap is provided, said rotor surface being an involute of a base cylinder whose longitudinal axis coincides with the axis of rotation of said rotor and said stator surface substantially coinciding with said rotor surface when said surfaces are in juxtaposed relation whereby on rotation of said rotor from one position to another said surfaces are at a uniform distance apart with the distance depending upon the position of said rotor relative to said stator, and an energizable winding on said core structure the flux linking which is varied on rotation of said rotor relative to said stator as a result of variation in the length of the air gap between said surfaces.

ALBERT M. CANDY.

REFERENCES CITED

The following references are of record in the file of this patent:

UNITED STATES PATENTS

| Number | Name | Date |
|---|---|---|
| 1,699,142 | Hendricks | Jan. 15, 1929 |
| 1,937,394 | Thoresen | Nov. 28, 1933 |
| 2,136,798 | Lucas | Nov. 15, 1938 |
| 2,374,883 | Nawl | May 1, 1945 |
| 2,431,860 | Friedlander | Dec. 2, 1947 |

FOREIGN PATENTS

| Number | Country | Date |
|---|---|---|
| 293,766 | Germany | May 2, 1917 |

Certificate of Correction

February 8, 1949.

Patent No. 2,460,921.

ALBERT M. CANDY

It is hereby certified that errors appear in the printed specification of the above numbered patent requiring correction as follows:

Column 9, line 34, claim 1, for the word "primary" read *secondary*; column 10, line 53, claim 10, for "motor" read *rotor*;

and that the said Letters Patent should be read with these corrections therein that the same may conform to the record of the case in the Patent Office.

Signed and sealed this 31st day of May, A. D. 1949.

[SEAL]

THOMAS F. MURPHY,
*Assistant Commissioner of Patents.*